July 24, 1923.

F. G. SCHENUIT

TIRE CASING

Filed Nov. 15, 1922

1,462,984

Inventor
Frank G. Schenuit
By
Mann & Co.
Attorneys.

Patented July 24, 1923.

1,462,984

UNITED STATES PATENT OFFICE.

FRANK G. SCHENUIT, OF BALTIMORE, MARYLAND.

TIRE CASING.

Application filed November 15, 1922. Serial No. 600,992.

*To all whom it may concern:*

Be it known that FRANK G. SCHENUIT, a citizen of the United States, residing at Baltimore, in the State of Maryland, has invented certain new and useful Improvements in Tire Casings, of which the following is a specification.

This invention relates to improvements in casings for pneumatic tires and has for its object to provide an improved side-wall construction for tire-casings which will materially strengthen and reenforce the side wall against wear when traveling on roads which contain ruts and stones; which will provide protection against damage by curbs when parking parallel to a side-walk and which will material decrease damage caused by heating of the casing from friction during travel over a road.

The invention is illustrated in the accompanying drawing, wherein,—

Figure 1:
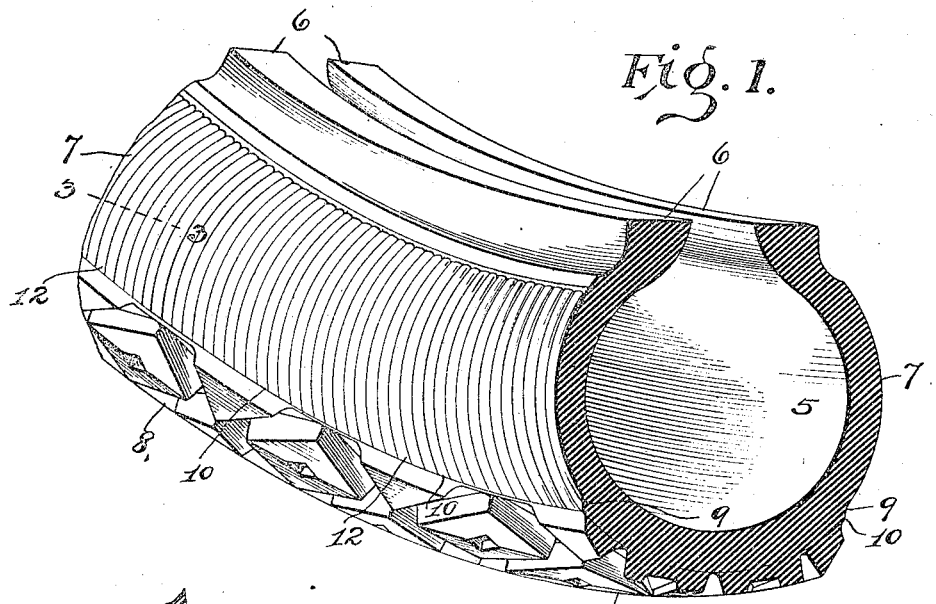

Fig. 1. shows a portion of the casing in side elevation.

Figure 2:
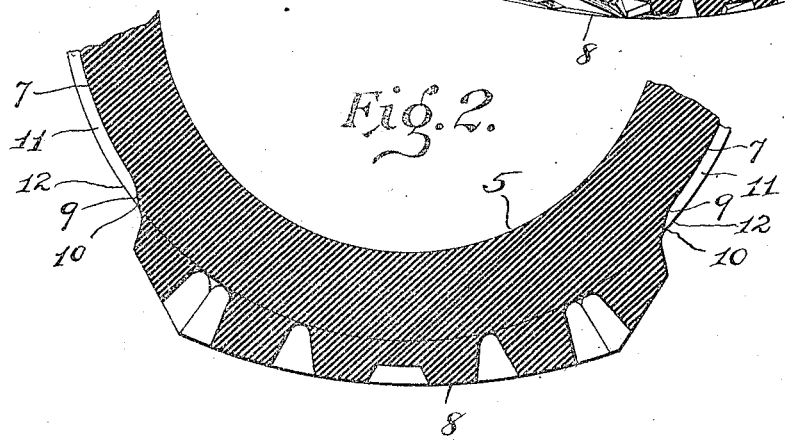

Fig. 2. illustrates a cross-sectional detail through the casing, and

Figure 3:
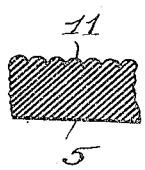

Fig. 3. shows a sectional detail through a fragment of the side wall of the casing as the same would appear if cut on the line 3—3 of Fig. 1.

Referring to the drawing the numeral 5, designates the inner face of the casing which receives the pneumatic tube; 6 the flange or bead by which the casing is held about a wheel-rim; 7 designates the side wall of the casing and 8 the tread of the same.

In so far as my present invention is concerned, it is immaterial as to how the interior of the casing walls are made or built up. By this, I mean that my invention has nothing whatever to do with the internal construction of the casing as to its plies or the manner of their formation, neither is it to be confined to any particular design or formation of the tread portion 8 as this may vary to suit the whim of the manufacturer.

In carrying out my invention I aim to provide a reenforcement of a novel character for the side wall of the casing between the tread and the flange or bead which reenforcement will not only protect and increase the wearing surface of the side wall but will be of such a nature as to materially assist in keeping down the heat by providing an increased surface that will be subjected to air currents that will aid in keeping the casing cool.

In the preferred embodiment of my invention, I provide a greater thickness of rubber at the tread 8 and adjacent to the side edges of the latter than at the side walls 7, and at the point where the side walls and the tread join, I form a slight annular concavity 9 which produces an annular ridge 10. From this ridge 10 and extending across the side wall toward the annular flange or bead 6, I provide a series of corrugations or ribs 11.

The outer ends 12 of these ribs terminate at the side of the annular ridge 10 and in the concavity 9 so that no shoulder is formed at the ends of the ribs adjacent to the tread.

The corrugations or ribs employed by me are not annular endless beads but are ribs or corrugations that extend in a direction crosswise of the casing and more nearly at right angles to a given point on the tread.

It may be said that my improved corrugations or ribs 11 extend radially along the sides from the center of the casing toward the tread but it is to be understood that these corrugations or ribs may incline or extend somewhat on a tangent with respect to the annular concavity 9 and ridge 10, instead of being concentric with respect to either the inner or outer circumferences of the casing.

As a matter of fact, the series of ribs or corrugations 11 formed on the side walls by me are so disposed that their lines of direction, if continued, would cross both the inner and outer circumferential lines of the casing.

Side walls of a tire-casing having the series of ribs or corrugations arranged in accordance with my invention, afford no shoulders or projections parallel or concentric with the tread to be cut or chipped off by the walls of a rut or by stones or other devices lying on the road immediately at the sides of that portion of the tread which is in contact with the road.

Moreover, my so-called radially-arranged ribs or corrugations sweep around with the casing and cut through the air in a way that will materially assist in cooling the wall-surfaces.

Having described my invention, I claim,—

1. An annular casing for vehicle tires having a thickened thread around its outer circumference and provided with side walls each of which has an annular flange or bead around its inner circumference, said casing also having a series of ribs projecting from its outer side wall surface which ribs extend in a direction from the base of the flange or bead toward but terminate at the side edge of the thickened annular tread.

2. An annular casing for vehicle tires having a tread surface at its outer circumference and also having side walls each of which has a flange or bead around its inner circumference, the outer face of each side wall being provided with a continuous series of short side ribs the outer ends of which ribs terminate adjacent to the tread surface and extend toward the flange or bead at the same side of the casing.

3. An annular casing for vehicle tires having a tread surface at its outer circumference and provided with side walls, each side flange or wall of the casing being separated from the annular tread surface by an annular ridge at the base of the tread and each of said side walls of the casing being provided with a continuous series of ribs whose outer ends terminate at said annular ridge said ribs extending toward and terminating at the base of the flange or bead at the inner circumference of the side wall of the casing.

In testimony whereof I affix my signature.

FRANK G. SCHENUIT.